E. C. PORTER.
BEE ESCAPE.
APPLICATION FILED SEPT. 23, 1910.
987,256. Patented Mar. 21, 1911.
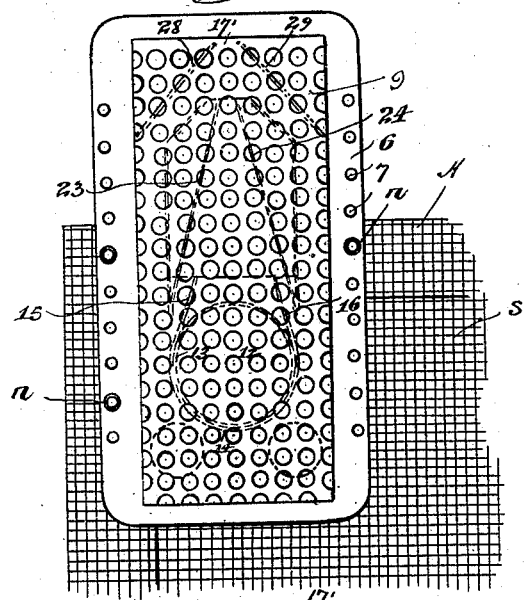
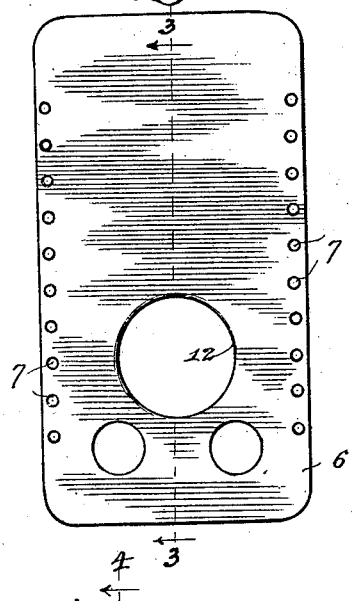
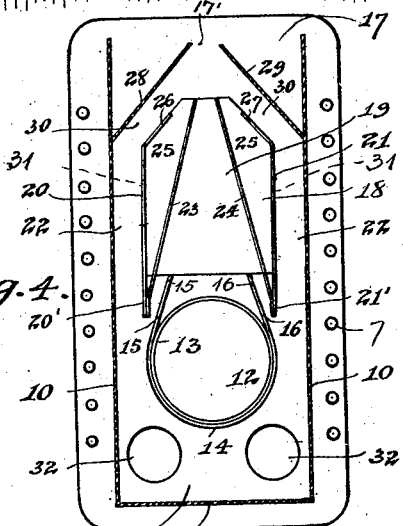
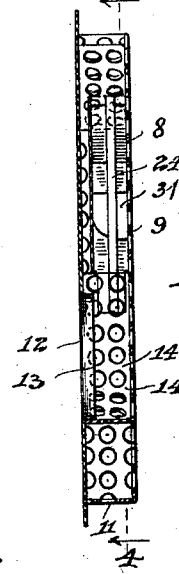
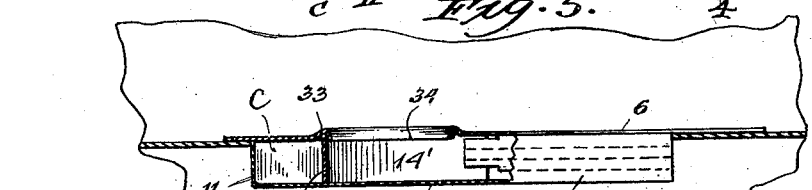
Witnesses
Inventor:
Edmund C. Porter

UNITED STATES PATENT OFFICE.

EDMUND C. PORTER, OF LEWISTOWN, ILLINOIS.

BEE-ESCAPE.

987,256.     Specification of Letters Patent.     Patented Mar. 21, 1911.

Application filed September 23, 1910. Serial No. 583,354.

*To all whom it may concern:*

Be it known that I, EDMUND C. PORTER, a resident of Lewistown, in the county of Fulton and State of Illinois, have invented certain new and useful Improvements in Bee - Escapes, of which the following is a full, clear, and precise specification.

My invention may be considered as an improvement over the construction and arrangement shown in Patent No. 489,754, January 10, 1893, to Rufus Porter.

One of the main objects of the invention is to restrict the areas of the outlet ends of outlet passages to offer greater resistance and complexity to the reëntrance of intruding bees, this to be accomplished without in any way hampering or restricting the outward travel of bees through the escape.

Another object is to provide passageways so arranged that if a bee should succeed in intruding through the final outlet it will be tempted to follow along the passageways to be eventually landed on the outside of the escape.

Another object is to construct the escape of perforated sheet metal or otherwise so that there will be plenty of light and ventilation to prevent smothering of stalled bees, and also to enable intruding bees to see the bees traveling outwardly through the escapement channel and thus to be tempted to follow the direction of travel of the escaping bees to be eventually also landed at the outside of the escapement.

Another object is to provide a construction and arrangement which will prevent dead bees from being carried or shoved into the escape by the live bees, thus to insure against choking up of the escape.

My invention will be more clearly understood by referring to the following specification and the accompanying drawing, in which drawing—

Figure 1 is a plan view of my improved escape, showing it applied to a compartment from which the bees are to be removed, Fig. 2 is a plan view of the base side of the escape, Fig. 3 is a sectional view taken on plane 3—3, Fig. 2, Fig. 4 is a sectional view taken on plane 4—4, Fig. 3, and Fig. 5 is a side view of a somewhat modified form of escape and showing it applied in horizontal position between two compartments.

The escape comprises a base plate 6 preferably of metal, such as tin, this base plate being provided with marginal openings 7 for enabling it to be secured to the walls or wire screening or other part of a compartment in various positions. A rectangular frame 8 comprises the main wall 9, sections of which sides and one end are bent at right angles to form side walls 10, and the end wall 11, the edges of these walls being soldered or otherwise secured to the base plate 6 to form therewith a rectangular main compartment C. The end of the base plate adjacent the wall 11 has the circular entrance opening 12 whose edge is deflected inwardly to form a peripheral flange 13 at substantially right angles with the base plate. Bent about this flange and held in place thereto or to the base, as by solder, is a band 14 of sheet metal, whose ends 15 and 16 extend tangentially from the flange 13 toward the outlet end 17 of compartment C, and converging slightly. Within the compartment C there is a U-shaped trough 18 comprising a base or run-way 19 and side walls 20 and 21. The trough is preferably held in place by being soldered at the edges of its side walls to the wall 9 of frame 8, the trough extending longitudinally within the compartment C with the rear edge of its base or run-way 19 abutting against the ends 15 and 16 of the band 14, and the width of the trough being sufficiently less than the width of the frame 8, so that passageways 22 are left between the side walls of the trough and of the frame 8 respectively, these passageways being of sufficient width to allow the passage therethrough of bees. The ends 20′, 21′ of the trough side walls extend a distance beyond the floor 19 and adjacent the ends 15 and 16 of the band 14, the ends 20′ and 21′ supporting respectively the leaf springs 23 and 24, the springs preferably having one of their ends soldered to the extensions and extending longitudinally and convergently through the trough and terminating at the front or upper end thereof. The springs are very light and their free ends come quite close together, so that a bee, in order to leave the trough must force the springs apart; but it will be impossible for intruding bees to enter the trough in the opposite direction between these springs.

In order to prevent intruding bees from entering into the space 25 between the springs and the side walls of the trough the outlet ends 26 and 27 of these side walls are deflected inwardly toward the spring ends. The outlet 17 from compartment C is also restricted by wall sections 28 and 29 extending from the side walls 170 and diagonally toward each other to leave the restricted outlet passageway 17'. These wall sections may be formed by deflecting inwardly the end sections of the wall 10, or, as shown, separate pieces may be inserted in place.
These wall sections 28 and 29 are preferably parallel with the inwardly deflected ends 26 and 27 of the trough, and at a distance therefrom equal to the width of the passageways 22, and the corners of the floor or run-way 19 outside of the ends 26 and 27 are cut away, the ends 26 and 27 and the wall sections 28 and 29 then forming passageways 30 which are continuations of the passageways 22, the inner end of the compartment C about the band 14 being then connected through two paths with the outlet 17'.

One use of the escape is illustrated in Fig. 1, where it is applied to a compartment A, of which a side wall is formed by the screen *s*. The escape is applied against the screen at an upper corner of the compartment and is held in place by nails or screws *n* driven through opening 7 into the wooden frame of the compartment to hold the inlet opening 12 in register with a suitable opening in the screen. The bees in the compartment will now find their way into the escape of opening 12 and will be guided by the ends 15 and 16 of band 14 onto the floor or run-way 19 of the trough 18 between the springs in said trough, and the bees, seeing the outlet 17', will one by one force their way out from between the spring ends and escape through the outlet 17', the wall sections 28 and 29 tending to guide the bees to the outlet after they leave the trough. Should any bees become disabled they will fall from the trough into the compartment 14' formed by the band and the section of the wall 9 engaged thereby, or will fall from this chamber back into the compartment, thus preventing clogging up of the trough. The outlet 17' is of just sufficient width to enable escaping bees to easily pass therethrough, but intruding bees will encounter the more or less sharp edges or ends of the wall sections 28 and 29 and will become discouraged. Should any intruding bee succeed in squeezing through the outlet 17' it will encounter the ends of the springs 23 and 24, but it will be unable to push these springs apart in order to enter between them. If it should succeed in squeezing between one of the springs and one of the ends 26 and 27 into one of the spaces 25 it would be prevented by the spring from reaching the opening 12. I, however, cut away part of the side walls 20, 21 to leave openings 31, as best shown in Fig. 3, and the bee can, therefore, either leave the space 25 by the way it entered, or it can pass through the opening 31 into the adjacent passageway 22, and it can travel through this passageway and through adjacent passageway 30 and out again through outlet 17', or it can travel in the other direction about the band 14' in the opposite passageways 22 and 30, thence out at outlet 17'. If an intruding bee enters the outlet and gets into the passageway 30 it will be directed along this passageway into the adjacent passageway 22 and around the band 14 back to the opposite passageways 22 and 30 and again out at the outlet, or it can enter into either one of the openings 30 to the space 25 and thence from said space out of the trough and the outlet 17'. In any event the bee will always be directed and coaxed toward the outlet 17'.

In order that the bees may have plenty of light and air during travel through the escape the frame 8 is made of perforated sheet metal or of gauze or screen material, and the band 14 and wall sections 28 and 29 are also preferably of such material. The bees will, therefore, not be smothered in case they should become stalled in the escape for some reason or other. The open material also greatly assists in inducing intruding bees to leave, as such bees can see the out-going bees and will naturally follow in the same direction to be eventually landed at the outside with the naturally escaping bees. Another advantage of having the frame 8 of open material is that the attendant can observe the passage of the bees through the escape. The perforated material also provides a better foot-hold for the bees. The frame 8, instead of being permanently soldered or otherwise secured to the base 6, can be detachably secured so that it can be removed at any time, as for instance, when there are dead bees in the escape. I have also shown openings 32 in the base 6 through which dead bees can be removed from the escape when the escape is detached from the supporting wall, these openings being, of course, closed when the escape is against a supporting wall, as the screen *s* in Fig. 1.

Where the escape device is to be used in horizontal position for shifting bees from one compartment to another, as for example, from an upper compartment into a lower compartment, the edge part of the base 6 surrounding the opening 12 is deflected outwardly to form a bead or ridge 33, this bead or ridge acting as a barrier to prevent dead or disabled bees from being pushed through the opening 12 into compartment 14' to accumulate there to clog up the escape. As shown, the bead or ridge can be formed by deflecting the edge about opening 12 outwardly and then inwardly so that the end 34 would form a support for the band 14. Of course where the escape device is used as in Fig. 5, the openings 32 are omitted or are closed. I therefore produce a bee escape through which bees can readily travel but which tends to prevent intruding bees from entering and which tends to direct and guide out of the escape such intruding bees as in some way have managed to enter, the device being entirely open for inspection by an attendant and to light and air for the bees therein.

I do not desire to be limited to the precise construction and arrangement which I have shown, as changes and modifications can be made which would still come within the scope of my invention, and I therefore claim the following:

1. In a bee escape, the combination of walls forming a compartment, one of said walls having an inlet opening and there being a restricted outlet from said compartment, a run-way interposed between said inlet and outlet, walls surrounding said inlet and run-way and forming a passageway between themselves and the walls of the compartment communicating with said outlet for directing intruding bees through the outlet, and escapement members for allowing escape of bees from said run-way to said outlet and for restricting the reëntrance of bees to said run-way.

2. In a bee escape, the combination of main walls forming an inclosure having an outlet at one end to the exterior, an inlet through one of said walls, a run-way interposed between said inlet and outlet, walls surrounding said run-way and inlet to form the main escape passageway for escaping bees and a surrounding passageway for intruding bees, both passageways communicating with said outlet, and means for preventing entrance of bees to said run-way toward said inlet.

3. In a bee escape, the combination of main walls forming an inclosure having an outlet at one end to the exterior, an inlet through one of said walls, a run-way interposed between said inlet and outlet, walls surrounding said run-way and inlet to form the main escape passageway for escaping bees and a surrounding passageway for intruding bees, both passageways communicating with said outlet, and means for allowing passageway of escaping bees through said run-way and outlet but for automatically preventing return of bees to said run-way after leaving thereof.

4. In a bee escape, the combination of walls forming an inclosure having an outlet at one end, an inlet through one of said walls, walls surrounding said inlet, and guide members extending from said inlet surrounding walls and toward said outlet, said inlet surrounding walls and said guiding members extending therethrough dividing said inclosure into an escapement passageway for escaping bees and an inclosing passageway for intruding bees, both passageways communicating with the outlet, said guiding members being adapted to automatically prevent passage of bees from the exterior to said escapement passageway.

5. In a bee escape, the combination of walls forming an inclosure having an outlet at only one end and having an inlet for communicating with a compartment from which bees are to escape, flexible escapement members for guiding bees from said inlet toward said outlet and forming a restricted escapement passageway, and a wall surrounding said inlet and being a continuation of said escapement members to confine the passage of bees toward said escapement members, said wall and the escapement members, together with the walls of the inclosure forming a passageway surrounding said escapement passageway and communicating with the outlet from said inclosure, said escapement members automatically preventing the return of bees toward said inlet.

6. In a bee escape, the combination of walls forming a main inclosure having an inlet at one end and a restricted outlet at the other end, a wall partly surrounding said inlet with its ends extending toward the outlet, a run-way having side walls extending from the ends of said inlet inclosing wall and toward the outlet to form an escape passageway for bees from the inlet to the outlet, the ends of the run-way walls deflecting toward each other to form a restricted outlet from said run-way adjacent the restricted outlet from the inclosure, said inlet surrounding wall and the run-way side walls, together with the walls of the inclosure, forming a passageway about said escapement passageway for deflecting intruding bees toward the inclosure outlet, and means for preventing bees from entering the run-way in a direction toward said inlet.

7. In a bee escape, the combination of walls forming a main inclosure having an inlet at one end and a restricted outlet at the other end, a wall partly surrounding said inlet with its ends extending toward the outlet, a run-way having side walls extending from the ends of said inlet inclosing wall and toward the outlet to form an escape passageway for bees from the inlet to the outlet, the ends of the run-way walls deflecting toward each other to form a restricted outlet from said run-way adjacent the restricted outlet from the inclosure, said inlet surrounding wall and the run-way side walls, together with the walls of the inclosure, forming a passageway about said escapement passageway for deflecting intruding bees toward the inclosure outlet, and escapement members extending through said run-way toward the inclosure outlet, said escapement members automatically preventing bees from entering the run-way in a direction toward said inlet.

8. In a bee escape, the combination of walls forming a main inclosure having an inlet at one end and a restricted outlet at the other end, a wall partly surrounding said inlet with its ends extending toward the outlet, a run-way having side walls extending from the ends of said inlet inclosing wall and toward the outlet to form an escape passageway for bees from the inlet to the outlet, the ends of the run-way walls deflecting toward each other to form a restricted outlet from said run-way adjacent the restricted outlet from the inclosure, said inlet surrounding wall and the run-way side walls, together with the walls of the inclosure, forming a passageway about said escapement passageway for deflecting intruding bees toward the inclosure outlet, and guide members extending from the inner end of said run-way to the restricted outlet thereof, said guide members allowing escape of bees from the run-way but preventing the entrance of bees thereto in a direction toward said inlet.

9. In a bee escape, the combination of walls forming an inclosure having an inlet at one end and a restricted outlet at the other end, a wall partly surrounding said inlet with its ends extending toward said outlet, and escapement mechanism between said inlet and outlet for allowing the escape of bees from the inlet to the outlet but for preventing bees from passing from the outlet to the inlet, said inlet surrounding wall and said escapement mechanism, together with the walls of the inclosure, forming a surrounding passageway for the passage of intruding bees to the inclosure outlet.

10. In a bee escapement, the combination of walls forming a main inclosure having inlet at one end and outlet at the other, a wall partly surrounding said inlet with said ends extending toward said outlet, a run-way having side walls extending from the inlet surrounding wall ends and toward said outlet, said inlet surrounding wall and the run-way side walls, together with the inclosure walls, forming a surrounding passageway having communication with the outlet, escapement members extending from the inner end of the run-way toward the outer end thereof for allowing passage of escaping bees from the inlet to the outlet but for preventing entrance of bees to the run-way in a direction toward the inlet, said surrounding passageway serving to guide intruding bees back to the outlet, there being spaces between the escapement members and the run-way side walls, said run-way side walls having openings for connecting said spaces with said surrounding passageway whereby intruding bees which may gain access to said spaces may find their way to the surrounding passageway to be guided back to the outlet.

11. In a bee escape, the combination of a base plate, walls of open material applied to said base plate to form a main inclosure therewith having an outlet at one end and an inlet at the other, and means for guiding escaping bees from said inlet to said outlet and for automatically preventing passage of bees from the outlet to the inlet.

12. In a bee escape, the combination of walls forming an inclosure having an inlet at one end and an outlet at the other, escapement mechanism for allowing escape of bees from the inlet to the outlet and for preventing passage of bees from said outlet to the inlet, and a ridge surrounding the entrance edge of said inlet.

In witness hereof I hereunto subscribe my name this 21st day of September, A. D., 1910.

EDMUND C. PORTER.

Witnesses:
CHARLES J. SCHMIDT,
NELLY B. DEARBORN.

---

Copies of this patent may be obtained for five cents each, by addressing the "Commissioner of Patents, Washington, D. C."